United States Patent
Fujita et al.

(10) Patent No.: US 8,353,391 B2
(45) Date of Patent: Jan. 15, 2013

(54) FLOATING TYPE BRAKE DISC

(75) Inventors: Nobuhiro Fujita, Shizuoka (JP);
Masato Nakayama, Shizuoka (JP);
Hidekazu Kawai, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 25 days.

(21) Appl. No.: 12/996,430

(22) PCT Filed: Jun. 30, 2009

(86) PCT No.: PCT/JP2009/061955
§ 371 (c)(1),
(2), (4) Date: Dec. 6, 2010

(87) PCT Pub. No.: WO2010/004913
PCT Pub. Date: Jan. 14, 2010

(65) Prior Publication Data
US 2011/0079474 A1    Apr. 7, 2011

(30) Foreign Application Priority Data

Jul. 8, 2008 (JP) ................................. 2008-178184
Jul. 8, 2008 (JP) ................................. 2008-178185

(51) Int. Cl.
*F16D 65/12* (2006.01)
(52) U.S. Cl. ................................. 188/218 XL
(58) Field of Classification Search ............ 188/218 XL, 188/18 A, 26, 17
See application file for complete search history.

(56) References Cited

U.S. PATENT DOCUMENTS

| | | | | |
|---|---|---|---|---|
| 3,754,627 A | * | 8/1973 | Hotchkiss | 192/107 R |
| 4,790,413 A | * | 12/1988 | Meynier | 188/18 A |
| 6,957,726 B2 | * | 10/2005 | Gehrs | 188/218 XL |
| 2005/0145452 A1 | * | 7/2005 | Yamamoto | 188/218 XL |
| 2007/0102247 A1 | * | 5/2007 | Takenaka et al. | 188/26 |
| 2008/0264741 A1 | | 10/2008 | Fujita et al. | |

FOREIGN PATENT DOCUMENTS

| | | |
|---|---|---|
| JP | 2-42897 Y2 | 11/1990 |
| JP | 2534771 Y2 | 2/1997 |
| JP | 2005-048787 A | 2/2005 |
| JP | 2006-161863 A | 6/2006 |
| WO | WO2005/111457 A1 | 11/2005 |

OTHER PUBLICATIONS

International Search Report for PCT Patent App. No. PCT/JP2009/061955 (Oct. 6, 2009).

* cited by examiner

*Primary Examiner* — Bradley King
*Assistant Examiner* — Vishal Sahni
(74) *Attorney, Agent, or Firm* — Cermak Nakajima LLP; Tomoko Nakajima (57) ABSTRACT

A floating type brake disc is provided which is capable of limiting the heat escape from a rotor to a hub to the extent possible and which can be made smaller in weight. In a plurality of circumferential positions of the hub, there are formed pin-receiving portions in a manner to enclose a connecting pin from three directions of a radially inward, one of circumferentially both sides and a radially outward of the brake disc. A tongue-shaped pin-receiving portion is formed on each of a plurality of inner circumferential positions of the rotor 1 so as to be elongated radially inward to pinch the connecting pin between the tongue-shaped pin-receiving portion and the pin-receiving portion that is formed in the hub.

12 Claims, 4 Drawing Sheets

(Prior Art)

FLOATING TYPE BRAKE DISC

This application is a national phase entry under 35 U.S.C. §371 of PCT Patent Application No. PCT/JP2009/061955, filed on Jun. 30, 2009, which claims priority under 35 U.S.C. §119 to Japanese Patent Application Nos. 2008-178184, filed Jul. 8, 2008, and 2008-178185, filed on Jul. 8, 2008, all of which are incorporated by reference.

TECHNICAL FIELD

The present invention relates to a floating type brake disc having an annular rotor, and a hub to be disposed on the inner side of the rotor, and in which the rotor and the hub are connected together by connecting pins at a plurality of circumferential positions.

BACKGROUND ART

Conventionally, in this kind of floating type brake disc, there are formed: pin-receiving portions at a circumferentially plurality of positions on an inner circumference of a rotor, each of the pin-receiving portions being projected radially inward and having a semi-circular notch at a radially inner end; and pin-receiving portions at a circumferentially plurality of positions on an outer circumference of a hub, each of the pin-receiving portions being projected radially outward and having a semi-circular notch at a radially outer end. By butting together the pin-receiving portions of the rotor and the pin-receiving portions of the hub, there are formed pin openings by the notches of both the pin-receiving portions so that a connecting pin can be inserted into each of the pin openings (see, e.g., patent document 1).

By the way, at the time of braking, the rotor is heated to a high temperature due to sliding contact of the rotor with a brake pad. The heat will then escape to the hub side through the pin-receiving portions of the rotor and through the connecting pins. In the above-described conventional example, since there is formed, at the radial end of each of the pin-receiving portions of the rotor, the notch to receive therein half the circumference of the connecting pin, the amount of escape of heat through the pin-receiving portion becomes large. As a result, the rotor gives rise to an unevenness in temperature with a large temperature difference. Should this phenomenon be repeated at each time of braking, there is a possibility of giving rise to thermal distortion of the rotor.

Figure 5:
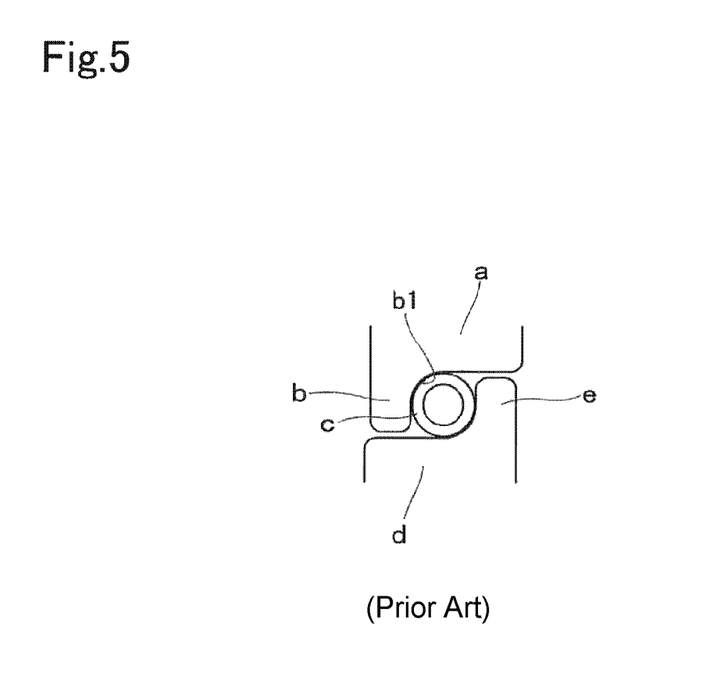
FIG. 5 is an enlarged view of an essential portion of the brake disc according to a conventional example.

As shown in FIG. 5, there is also known an example in which a pin-receiving portion b of a rotor "a" is formed so as to enclose a connecting pin c from diametrically outside of and circumferentially one side of a brake disc. Also there is formed a pin-receiving portion e of a hub d so as to enclose the connecting pin c from a diametrically inner side of and the circumferentially opposite side of the brake disc (see, e.g., patent document 2).

In this example, the area of contact of the pin-receiving portion b of the rotor "a" with the connecting pin c becomes smaller than the one as described in patent document 1. As a result, the escape of heat through the pin-receiving portion b can be limited to a certain degree. However, the pin-receiving portion b of the rotor "a" has a portion b1 that encloses the connecting pin b from the diametrically outside of the brake disc. Therefore, the escape of heat occurs from this portion b1, and the escape (transmission) of heat cannot be sufficiently limited.

In addition, the hub is generally made of an aluminum alloy, and the rotor is formed of stainless steel in order to secure heat resistance. In order to reduce the weight of the brake disc, it is necessary to reduce the weight of the rotor that is formed of stainless steel having a high specific gravity. For that purpose, it becomes necessary to minimize the size of the pin-receiving portion of the rotor to the extent possible. In the example as shown in patent document 2, the pin-receiving portion b of the rotor "a" becomes smaller than the one as shown in patent document 1. However, in order to attain a further reduction in weight, it is desired to cut away the above-mentioned portion b1 from the pin-receiving portion b.

In the floating type brake disc, there is inserted onto an external surface of the connecting pin a disc spring (urging means) which connects the rotor and the hub in a floated state by urging the two members in the axial direction. Since the disc spring is subjected to repeated elastic deformation due to various kinds of loads to be operated when the disc brake is put into operation, the disc spring is required to have high durability. As a solution, patent document 3 discloses one in which the disc spring is made up of a disc-like flat plate portion which has formed therein an opening to enable the disc spring to be inserted onto an external surface of the connecting pin; and a skirt-like elastic supporting portion which is provided on an outer circumference of the flat plate portion.

However, in the example described in the patent document 3, the outer peripheral edge of the elastic supporting portion is substantially in linear contact with the axial surfaces of the rotor and the hub in a connected state. Therefore, whenever it is subjected to elastic deformation when load is applied (the elastic deformation being such that the elastic supporting portion is deformed under load in a manner to expand, or is restored back to the original state as a result of removal of the load), the outer peripheral edge of the elastic supporting portion slides in frictional contact with the axial surfaces of the rotor and the hub. As a result, there is a problem in that the surfaces of the rotor and the hub wear out. In this kind of case, if the rotor and the hub have applied to the surfaces thereof a plating of Ni and the like for the purpose of rust prevention and the like, there is a possibility that the plating layer is damaged or peeled off. In this case, it is considered to interpose, e.g., a washer between the axial surfaces of the rotor and the hub and the disc spring. This solution, however, brings about an increase in the number of constituting parts, resulting not only in an increase in cost but also in a troublesome work of connecting the rotor and the hub together.

PRIOR ART DOCUMENT

Patent Document

Patent Document 1: JP-A-2005-48787
Patent Document 2: Japanese Utility Model Registration No. 2,534,771
Patent Document 3: JP-UM-B-2-42897

Problems to be Solved by the Invention

In view of the above points, it is a first object of this invention to provide a floating type brake disc in which the escape of heat from the rotor to the hub can be limited to the extent possible and in which the weight can also be reduced. It is a second object of this invention to provide an inexpensive floating type brake disc in which the wear on the rotor and the hub attributable to the elastic deformation of the urging means can be limited without increasing the number of the constituting parts.

Means for Solving the Problems

In order to attain the above-mentioned first object, this invention is a floating type brake disc comprising: an annular rotor; and a hub disposed on an inside of the rotor, the rotor and the hub being connected together by a connecting pin at each of a plurality of circumferential positions. A pin-receiving portion is formed at each of the plurality of circumferential positions on a periphery of the hub so as to receive therein the connecting pin in a manner to enclose the connecting pin from three directions of a radially inner direction, one of circumferentially both sides, and a radially outer direction of the brake disc. The pin-receiving portion has an opening on the other of circumferentially both sides. A tongue-shaped pin-receiving portion is formed at each of the plurality of inner circumferential positions of the rotor so as to be elongated radially inward to close the opening in the pin-receiving portion to be formed in the hub. The tongue-shaped pin-receiving portion is adapted to pinch the connecting pin between the tongue-shaped pin-receiving portion and the pin-receiving portion to be formed in the hub.

According to this invention, the pin-receiving portion to be formed in the hub encloses the connecting pin from three directions of the radially inner direction, one of circumferentially both sides, and the radially outer direction of the brake disc. Therefore, contrary to the example as described in the patent document 2, the pin-receiving portions to be formed on the rotor need not be provided with a portion which encloses the connecting pin from the radially outward of the brake disc. In this manner, the escape of heat through the pin-receiving portions to be formed on the rotor can be limited to the extent possible, whereby the occurrence of temperature unevenness of large temperature difference in the rotor can be prevented.

In this invention, preferably the rotor is formed of a stainless steel plate and the hub is formed of an aluminum alloy. According to this invention, since the pin-receiving portions to be formed in the rotor can be minimized in size to the extent possible, it is possible to reduce the weight of the rotor even though it is made of a stainless steel plate which is larger in specific gravity. Although the pin-receiving portions to be formed in the hub may increase in size, the weight of the hub does not increase much by making the hub of an aluminum alloy of smaller specific gravity, notwithstanding the increase in size of the pin-receiving portions. The amount of reduction in weight in the rotor as a result of minimizing in size of the pin-receiving portions surpasses the amount of increase in the weight of the hub, and the weight of the floating type brake disc as a whole can be reduced.

In this invention, preferably a through hole is formed toward an inner circumferential portion of the rotor so as to be located at the same circumferential portion as the pin-receiving portion to be formed in the rotor. According to this arrangement, due to the presence of the through hole, the area of heat transfer to the pin-receiving portions is narrowed. The escaping of heat through the pin-receiving portions can more effectively be limited.

According to this invention, preferably the pin-receiving portion to be formed in the hub is made up of a first pin-receiving portion formed in a manner to enclose the connecting pin from three directions of the radially inner direction, the circumferentially one side, and the radially outer direction of the brake disc, and which has the opening on the circumferentially other side; and a second pin-receiving portion formed in a manner to enclose the connecting pin from three directions of the radially inner direction, the circumferentially other side, and the radially outer direction of the brake disc, and which has the opening on the circumferentially one side. The first pin-receiving portion and the second pin-receiving portion are formed alternately at a circumferential distance from each other. The pin-receiving portion to be formed in the rotor is made up of: a third pin-receiving portion to pinch the connecting pin against the first pin-receiving portion; and a fourth pin-receiving portion to pinch the connecting pin against the second pin-receiving portion. The third pin-receiving portion and the fourth pin-receiving portion are formed alternately at a circumferential distance from one another.

When the operating direction of the braking torque on the rotor is circumferentially one direction, the braking torque is transmitted to the hub through the third pin-receiving portion, the connecting pin, and the first pin-receiving portion. Therefore, it is possible to limit the pin-receiving portion to be formed on the hub and the pin-receiving portion to be formed on the rotor only to the first pin-receiving portion and the third pin-receiving portion, respectively. However, in the above-described arrangement, when the brake disc is connected to the axle the wrong side out (i.e., in the reversed manner), the braking torque can no longer be transmitted to the hub. On the other hand, by forming the first and the second pin-receiving portions in the hub and also by forming the third and the fourth pin-receiving portions in the rotor as described above, the braking torque can advantageously be transmitted to the hub even though the brake disc is connected to the axle the wrong side out.

In this invention, if the rotor and the hub are connected together by the connecting pins in a state of interposing therebetween an urging means for giving an axial urging force, preferably the urging means comprises: a disc-shaped flat plate portion having formed therethrough an opening to enable insertion of the urging means onto an external surface of the connecting pin; and a skirt-like elastic supporting portion which is provided on an outer circumference of the flat plate portion. An outer peripheral edge of the elastic supporting portion is bent toward the flat plate portion.

According to this arrangement, in a state of being connected by the connecting pins, the outer peripheral edge of the elastic supporting portion is away from the axial surfaces of the rotor and the hub. Instead, the portion from the outer peripheral edge to the flat plate portion comes into surface-contact with the axial surfaces of the rotor and the hub. Therefore, the pressure of the urging means toward the axial surfaces of the rotor and the hub is dispersed and reduced, thereby reducing the wear at the time of elastic deformation under load. As a result, without using separate parts such as washers, and the like, there can be materialized a construction in which the wear on the rotor and the hub can be limited only with the help of the urging means. Therefore, a lower cost can be attained and, in addition, the number of parts can be reduced, and the connecting work of the rotor and the hub can also be simplified.

Further, in order to effectively limit the wear at the time of elastic deformation under load, preferably the outer peripheral edge of the elastic supporting portion is away from the axial surfaces of the rotor and the hub in a state in which the rotor and the hub are connected together by the connecting pins, and at least half the region of the elastic supporting portion is in surface-contact with the axial surfaces of the rotor and the hub.

In addition, in case the urging means is constituted as described above, preferably each of the connecting pins comprises a cylindrical body portion and a flange portion which is formed at one longitudinal end of the body portion. Out of an inner diameter of the body portion, the side of longitudinally opposite end is formed locally smaller than the inner diameter on the side of the flange portion, and the opposite end is formed into a caulking portion of a larger thickness. In this manner, by forming the caulking portion into a larger thickness, the strength in the axial direction when the rotor and the hub are connected together by the connecting pins can be improved. There can be surely materialized a construction in which at least half the region of the elastic supporting portion is in surface-contact with the axial surfaces of the rotor and the hub.

EMBODIMENTS FOR CARRYING OUT THE INVENTION

Figure 1:
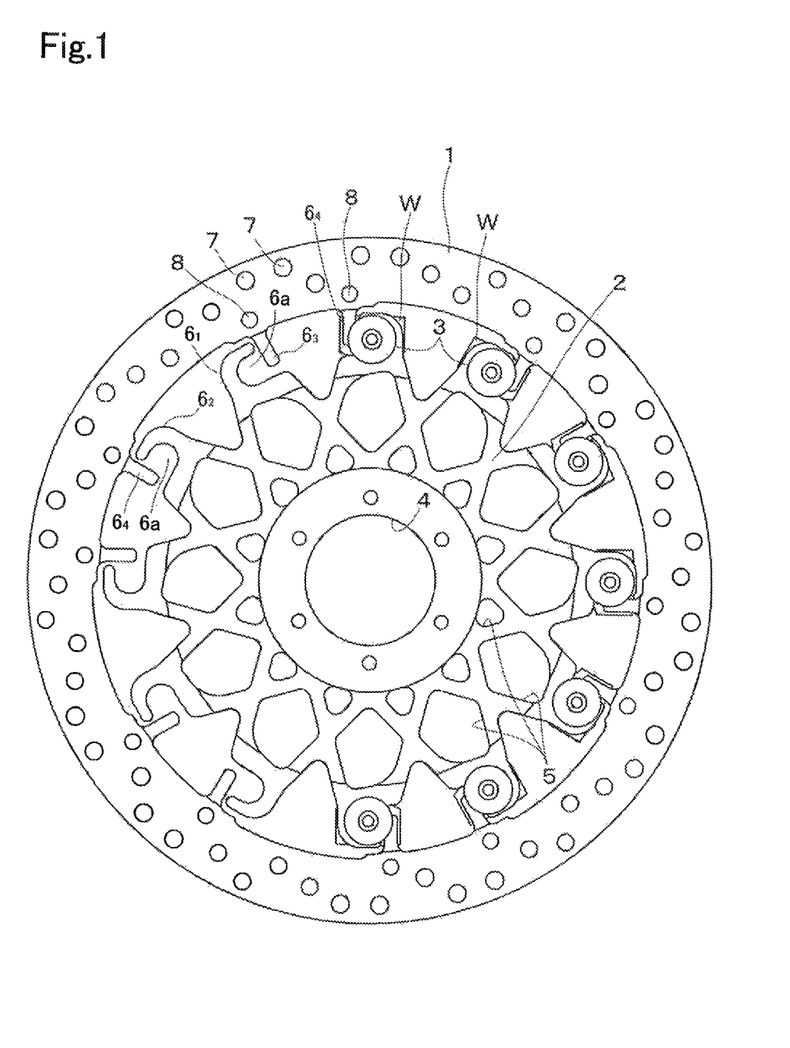
FIG. 1 is a front view of a brake disk according to an embodiment of this invention.

With reference to the accompanying drawings, a description will now be made of a floating type brake disc which is used in mounting on motor cycles. As shown in FIG. 1, a rotor 1 which comes into pressurized contact with pads (not illustrated) at the time of braking is made of a stainless steel plate and is formed into an annular shape. On an inside of the rotor 1 there is disposed a hub 2 which is connected to an axis of the motor cycle and which is made of an aluminum alloy. The rotor 1 and the hub 2 are connected together by connecting pins 3 at a plurality of circumferential positions, thereby constituting a floating type brake disc. The left half of FIG. 1 shows a state in which the connecting pins 3 are not mounted in position and the right half thereof shows a state in which the connecting pins 3 are mounted in position.

The hub 2 has formed therein a central axis bore 4 and a plurality of large and small holes 5 to reduce the weight thereof. On a periphery (outer circumference) of the hub 2 there are formed: first pin-receiving portions $6_1$ each of which receives the connecting pin 3 in a manner to enclose the connecting pin 3 from three directions of a radially inner direction, a circumferentially one side (counterclockwise direction), and a radially outward direction of the brake disc, and which has an opening 6a on circumferentially the other side; and second pin-receiving portions $6_2$ each of which receives the connecting pin 3 in a manner to enclose the connecting pin 3 from three directions of a radially inner direction, a circumferentially the other side (clockwise direction), and a radially outward direction of the brake disc, and which has an opening portion 6a on circumferentially one side. The first pin-receiving portions $6_1$ and the second pin-receiving portions $6_2$ are respectively formed alternately at a distance from each other in the circumferential direction.

On an inner circumference of the rotor 1 there are formed: tongue-shaped third pin-receiving portions $6_3$ each of which extends radially inward in a manner to close (block) the opening 6a of the first pin-receiving portion $6_1$ and pinches (sandwiches) the connecting pin 3 between the third pin-receiving portion $6_3$ and the first pin-receiving portion $6_1$; and tongue-shaped fourth pin-receiving portions $6_4$ each of which extends radially inward in a manner to close the opening of the second pin-receiving portion $6_2$ and pinches the connecting pin 3 between the fourth pin-receiving portion $6_4$ and the second pin-receiving portion $6_2$. The third pin-receiving portions $6_3$ and the fourth pin-receiving portion $6_4$ are respectively formed alternately at a circumferential distance from each other. Each of the third pin-receiving portions $6_3$ and the fourth pin-receiving portions $6_4$ is respectively formed thinner than the remaining portions of the rotor 1.

Figure 2:
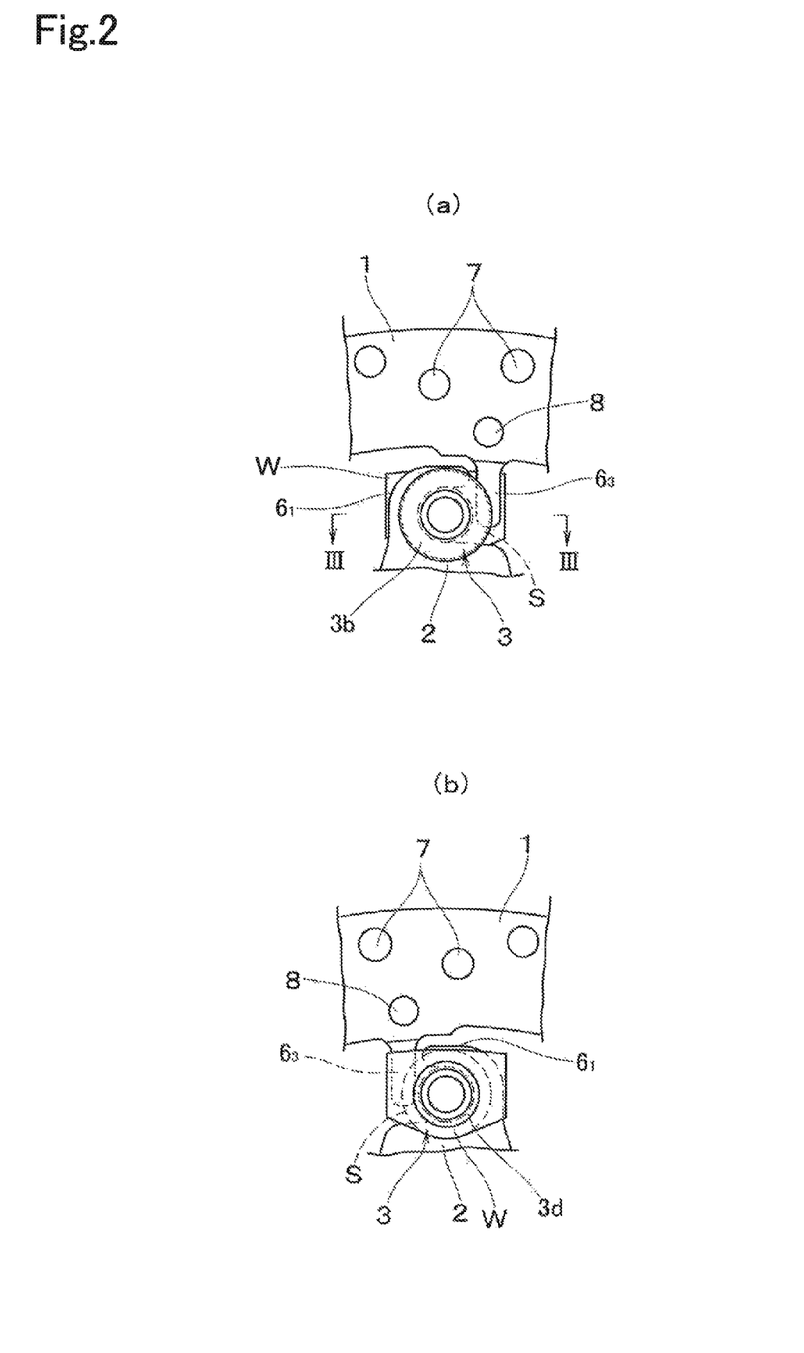
FIG. 2(a) is an enlarged front view of a portion of the first and the third pin-receiving portions of the brake disc as shown in FIG. 1.
FIG. 2(b) is an enlarged rear view of the first and the third pin-receiving portions.
Figure 3:
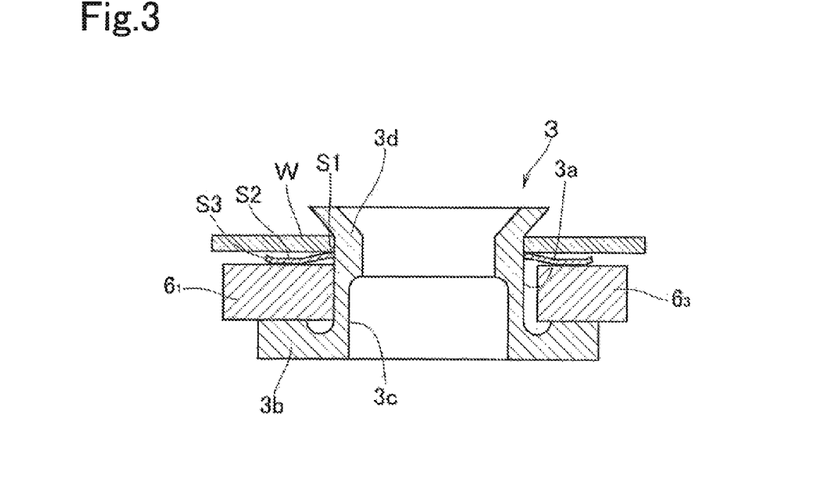
FIG. 3 is an enlarged sectional view taken along the line III-III in FIG. 2 (a).

With reference to FIGS. 2 and 3, the connecting pin 3 has a body portion 3a which is made up of a hollow pin of a slightly smaller diameter than the diameter of a circle whose outer diameter inscribes each of the first and the second pin-receiving portions $6_1$, $6_2$ and each of the third and the fourth pin-receiving portions $6_3$, $6_4$. On one longitudinal end of the body portion 3a, there is formed a flange portion 3b which comes into abutment with axially one side surface of each of the first and the second pin-receiving portions $6_1$, $6_2$ and each of the third and the fourth pin-receiving portions $6_3$, $6_4$.

On an inner wall of the body portion 3a there is formed a recessed portion 3c by cutting and the like from one end of the flange portion 3b to substantially the central portion. Out of the inner diameter of the body portion 3a, the side of longitudinally the other end is made locally smaller than the inner diameter on the side of the flange portion 3b. In this manner, the other end is made to be a thick-wall caulking portion 3d. The depth of the recessed portion 3c and the wall thickness of the body portion 3a in which the recessed portion 3c is formed can be arbitrarily selected within a range in which the strength of the connecting pin 3 can be secured.

When the rotor 1 and the hub 2 are connected together, the disc spring S which serves as the urging means and the washer W are inserted onto an external surface of the side of the other end of the connecting pin 3. In this state the other end of the connecting pin 3 is caulked by a known method such as a roller caulking method and the like. In this manner, the disc spring S is pressed through the washer W so as to bring the disc spring S into pressing (urging) contact with the axially other side surfaces of each of the first and the second pin-receiving portions $6_1$, $6_2$ and each of the third and the fourth pin-receiving portions $6_3$, $6_4$.

The washer W is made, e.g., of stainless steel and has a substantially rectangular external shape and has an area to cover the axial surfaces of each of the first and the second pin-receiving portions $6_1$, $6_2$ and each of the third and the fourth pin-receiving portions $6_3$, $6_4$.

Figure 4:
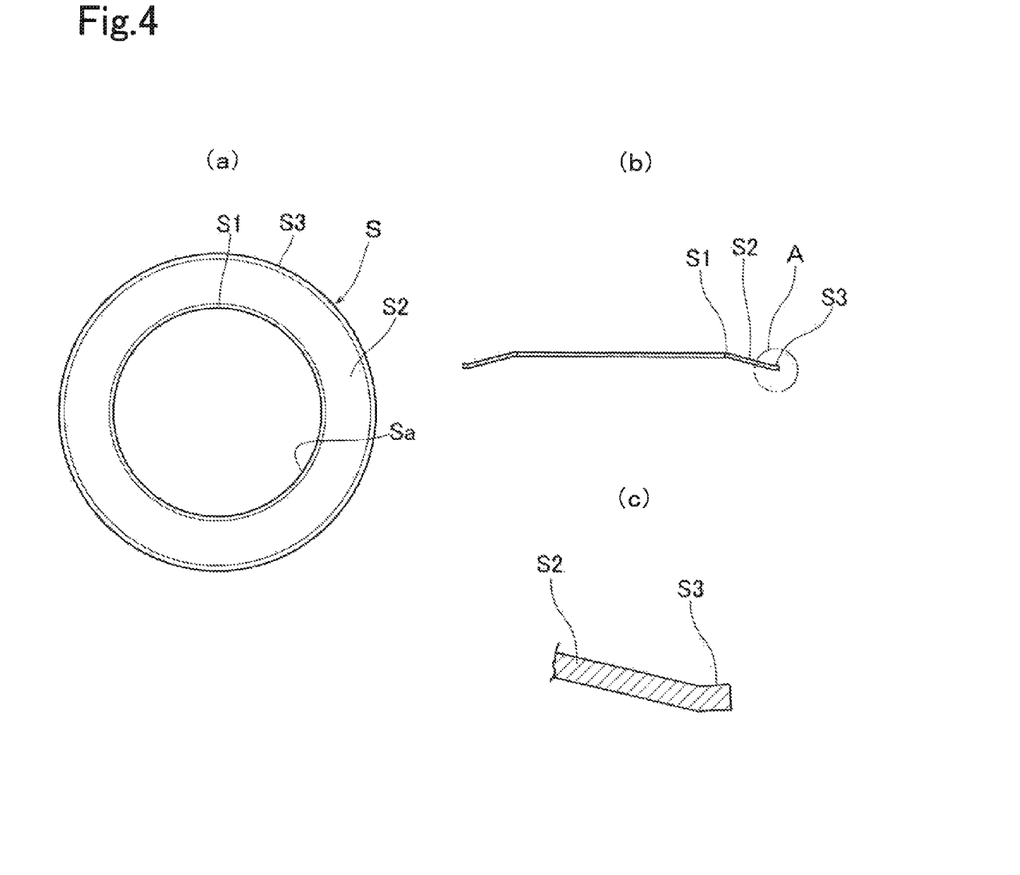
FIG. 4(a) is a front view of an urging means disposed in the brake disc shown in FIG. 1.
FIG. 4(b) is a sectional view of the urging means.
FIG. 4(c) is an enlarged sectional view of part "A" in FIG. 4(b).

With reference to FIGS. 3 and 4, the disc spring S is made, e.g., of stainless steel and has: a disc-shaped flat plate portion S1 in which an opening Sa is formed to enable inserting thereof onto the external surface of the connecting pin 3; and a skirt-like elastic supporting portion S2 which is provided on a periphery of the flat plate portion S1. The outer peripheral edge S3 of the elastic supporting portion S2 is bent toward the flat plate portion S1 (upward direction as seen in FIGS. 3 and 4).

In a state in which the longitudinally other end of the connecting pin 3 is caulked to thereby connect the rotor 1 and the hub 2 together, the peripheral edge S3 of the elastic supporting portion S2 is away from the axial surfaces of the rotor 1 and the hub 2, and at least half the region of the elastic supporting portion S2 will be in surface-contact with the axial surfaces of the rotor 1 and the hub 2. The rotor 1 and the hub 2 are thus connected together in such a manner: that they are relatively displaceable in the radial and circumferential directions by a slight clearance that exists between the peripheral surface of the connecting pin 3 and each of the first and the second pin-receiving portions $6_1$, $6_2$ and each of the third and the fourth pin-receiving portions $6_3$, $6_4$; and that they are relatively displaceable in the axial direction within a range in which the disc spring S can be deflected. As a result, the thermal expansion of the rotor 1 can be absorbed by the relative displacement of the rotor 1 and the hub 2, whereby the deformation of the entire brake disc can be limited. The region in which the elastic supporting portion S2 comes into surface-contact may appropriately be changed within a range in which the deflection of the disc spring S is possible when a load is operated upon.

As described so far, according to this embodiment, when the rotor 1 and the hub 2 are connected together, that pressure of the disc spring S which is operated on the axial surfaces of the rotor 1 and the hub 2 is dispersed and reduced. The wear that occurs at the time of elastic deformation when the load is operated upon can thus be effectively limited. As a result, while it is necessary for the disc spring of the prior art to use separate parts such as washers and the like between the disc spring and the axial surfaces of the rotor and of the hub, it is not necessary to use separate parts in this embodiment. It is thus possible to materialize the constitution in which the wear of the rotor 1 and the hub 2 can be limited only with the disc spring S. As a result, a lower cost can be attained and the number of constituting parts can be reduced to thereby simplify the work of connecting the rotor 1 and the hub 2 together.

In addition, out of the inner diameter of the body portion $3a$ of the connecting pin 3, the side of the longitudinally opposite end is formed locally smaller than the inner diameter on the side of the flange portion $3b$, and the opposite end is formed into the caulking portion $3d$ of a larger thickness. It is thus possible to improve the strength in the axial direction at the time of connecting the rotor 1 and the hub 2, and to surely materialize the constitution in which at least half the region of the elastic supporting portion S2 is in surface-contact with the axial surfaces of the rotor 1 and the hub 2.

In case the direction of operating the braking torque on the rotor 1 is counterclockwise, the braking torque is transmitted to the hub 2 through the third pin-receiving portion $6_3$, the connecting pin 3, and the first pin-receiving portion $6_1$. Here, in case the pin-receiving portion to be formed in the hub 2 and the pin-receiving portion to be formed in the rotor 1 are limited only to the first pin-receiving portion $6_1$ and the third pin-receiving portion $6_3$, the braking torque cannot be transmitted to the hub 2 when the brake disc is mounted on the axle in the opposite way, e.g., the wrong side out. As a solution, in this embodiment, the hub 2 has formed therein the first and the second pin-receiving portions $6_1$, $6_2$ and also the rotor has formed therein the third and the fourth pin-receiving portions $6_3$, $6_4$ so that the braking torque can be transmitted to the hub even in case the brake disc is connected to the axle in the opposite way, e.g., the wrong side out.

Further, the rotor 1 has formed therein a multiplicity of draining holes 7. In addition, along an inner circumference of the rotor 1, there are formed through holes 8 at the same circumferential positions as the third and the fourth pin-receiving portions $6_3$, $6_4$.

At the time of braking, the rotor 1 is heated to an elevated temperature by the sliding contact of the pad. The heat then escapes to the side of the hub 2 through each of the third and the fourth pin-receiving portions $6_3$, $6_4$ of the rotor 1 and through the flange portion $3a$ of the connecting pin 3. In this case, if the amount of escape of heat through the third and the fourth pin-receiving portions $6_3$, $6_4$ becomes large, there will occur large irregularities in temperature difference in the rotor 1. If this phenomenon is repeated at every braking operation, there is a possibility that thermal deformation occurs to the rotor 1.

In this embodiment, the first and the second pin-receiving portions $6_1$, $6_2$ to be formed in the hub 2 enclose the connecting pin 3 from the three directions of radially inside, one of circumferentially both sides, and radially outside of the brake disc. Therefore, it is not necessary to form, in the third and the fourth pin-receiving portions $6_3$, $6_4$, a portion to enclose the connecting pin 3 from the radially outside of the brake disc. As a result, the area of contact between each of the third and the fourth pin-receiving portions $6_3$, $6_4$ and the flange portion $3a$ of the connecting pin 3 can be reduced to the extent possible. In this manner, the escape of heat through each of the third and the fourth pin-receiving portions $6_3$, $6_4$ is limited to the extent possible, and the rotor 1 is prevented from giving rise to temperature variations of large temperature difference.

Further, in this embodiment, since each of the third and the fourth pin-receiving portions $6_3$, $6_4$ is formed into a smaller thickness, and since through holes 8 are formed at positions close to each of the pin-receiving portions $6_3$, $6_4$, the heat transfer area to each of the pin-receiving portions $6_3$, $6_4$ can be limited or narrowed. Therefore, the escape of heat through each of the third and the fourth pin-receiving portions $6_3$, $6_4$ can be limited more effectively.

Still furthermore, each of the third and the fourth pin-receiving portions $6_3$, $6_4$ is different from the arrangement in which the connecting pin 3 is enclosed from the radially outward of the brake disc. It can thus be minimized in size to the extent possible. Therefore, the rotor 1 made of stainless steel of larger specific gravity can be minimized in weight. Although each of the first and the second pin-receiving portions $6_1$, $6_2$ to be formed in the hub 2 may increase in size, the weight of the hub 2 does not increase much by making the hub 2 of an aluminum alloy of smaller specific gravity, despite the increase in size of the first and the second pin-receiving portions $6_1$, $6_2$. The amount of reduction in weight in the rotor 1 as a result of minimizing in size of each of the third and the fourth pin-receiving portions $6_3$, $6_4$ surpasses the amount of increase in the weight of the hub 2, and the weight of the floating type brake disc as a whole can be reduced.

DESCRIPTION OF REFERENCE NUMERALS 1 rotor
2 hub
3 connecting pin
$3a$ body portion
$3b$ flange portion
$3d$ caulking portion
$6_1$ first pin-receiving portion
$6_2$ second pin-receiving portion
$6a$ opening
$6_3$ third pin-receiving portion
$6_4$ fourth pin-receiving portion
8 through hole
S disc spring (urging means)
Sa opening
S1 flat plate portion
S2 elastic supporting portion
S3 front end circumference

What is claimed is:

1. A floating type brake disc comprising:
an annular rotor; and
a hub disposed on an inside of the rotor, the rotor and the hub being connected together by a connecting pin at each of a plurality of circumferential positions,
wherein a U-shaped pin-receiving portion is formed at each of the plurality of circumferential positions on a periphery of the hub so as to receive therein the connecting pin in a manner to enclose the connecting pin from three directions of a radially inner direction, one of circumferentially one side and circumferentially the other side, and a radially outer direction of the brake disc, the pin-receiving portion having an opening on the other of the circumferentially one side and the circumferentially the other side, wherein a tongue-shaped pin-receiving portion is formed at each of the plurality of circumferential positions on an inner circumference of the rotor so as to be elongated radially inward to close the opening in the U-shaped pin-receiving portion, the tongue-shaped pin-receiving portion being adapted to pinch the connecting pin between the tongue-shaped pin-receiving portion and the U-shaped pin-receiving portion, and the tongue-shaped pin-receiving portion having a point contact with the connecting pin, and wherein no portion of an inner circumferential surface of the rotor is in direct contact with the connecting pin.

2. The floating type brake disc according to claim 1, wherein the rotor is formed of a stainless steel plate and the hub is formed of an aluminum alloy.

3. The floating type brake disc according to claim 1, wherein a through hole is formed toward an inner circumferential portion of the rotor so as to be located at the same circumferential portion as the pin-receiving portion.

4. The floating type brake disc according to claim 2, wherein a through hole is formed toward an inner circumferential portion of the rotor so as to be located at the same circumferential portion as the pin-receiving portion.

5. The floating type brake disc according to claim 1,
wherein the U-shaped pin-receiving portion is made up of: a first pin-receiving portion formed in a manner to enclose the connecting pin from three directions of the radially inner direction, the circumferentially one side, and the radially outer direction of the brake disc, and which has the opening on the circumferentially the other side; and a second pin-receiving portion formed in a manner to enclose the connecting pin from three directions of the radially inner direction, the circumferentially the other side, and the radially outer direction of the brake disc, and which has the opening on the circumferentially one side, the first pin-receiving portion and the second pin-receiving portion being formed alternately at a circumferential distance from each other, and wherein the tongue-shaped pin-receiving portion is made up of: a third pin-receiving portion to pinch the connecting pin against the first pin-receiving portion; and a fourth pin-receiving portion to pinch the connecting pin against the second pin-receiving portion, the third pin-receiving portion and the fourth pin-receiving portion being formed alternately at a circumferential distance from one another.

6. The floating type brake disc according to claim 1,
wherein the rotor and the hub are connected together by the connecting pins in a state of interposing therebetween an urging means for giving an axial urging force, wherein the urging means comprises: a disc-shaped flat plate portion having formed therethrough an opening to enable insertion of the urging means onto an external surface of the connecting pin; and a skirt-like elastic supporting portion which is provided on an outer circumference of the flat plate portion, and wherein an outer peripheral edge of the elastic supporting portion is bent toward the flat plate portion.

7. The floating type brake disc according to claim 6,
wherein the outer peripheral edge of the elastic supporting portion is away from axial surfaces of the rotor and the hub in a state in which the rotor and the hub are connected together by the connecting pins, and wherein at least half the region of the elastic supporting portion is in surface-contact with the axial surfaces of the rotor and the hub.

8. The floating type brake disc according to claim 6,
wherein each of the connecting pins comprises a cylindrical body portion and a flange portion which is formed at one longitudinal end of the body portion, wherein, out of an inner diameter of the body portion, the side of longitudinally opposite end is formed locally smaller than the inner diameter on the side of the flange portion, and wherein the opposite end is formed into a caulking portion of a larger thickness.

9. The floating type brake disc according to claim 2,
wherein the U-shaped pin-receiving portion is made up of: a first pin-receiving portion formed in a manner to enclose the connecting pin from three directions of the radially inner direction, the circumferentially one side, and the radially outer direction of the brake disc, and which has the opening on the circumferentially the other side; and a second pin-receiving portion formed in a manner to enclose the connecting pin from three directions of the radially inner direction, the circumferentially the other side, and the radially outer direction of the brake disc, and which has the opening on the circumferentially one side, the first pin-receiving portion and the second pin-receiving portion being formed alternately at a circumferential distance from each other, and wherein the tongue-shaped pin-receiving portion is made up of: a third pin-receiving portion to pinch the connecting pin against the first pin-receiving portion; and a fourth pin-receiving portion to pinch the connecting pin against the second pin-receiving portion, the third pin-receiving portion and the fourth pin-receiving portion being formed alternately at a circumferential distance from one another.

10. The floating type brake disc according to claim 3,
wherein the U-shaped pin-receiving portion is made up of: a first pin-receiving portion formed in a manner to enclose the connecting pin from three directions of the radially inner direction, the circumferentially one side, and the radially outer direction of the brake disc, and which has the opening on the circumferentially the other side; and a second pin-receiving portion formed in a manner to enclose the connecting pin from three directions of the radially inner direction, the circumferentially the other side, and the radially outer direction of the brake disc, and which has the opening on the circumferentially one side, the first pin-receiving portion and the second pin-receiving portion being formed alternately at a circumferential distance from each other, and wherein the tongue-shaped pin-receiving portion is made up of: a third pin-receiving portion to pinch the connecting pin against the first pin-receiving portion; and a fourth pin-receiving portion to pinch the connecting pin against the second pin-receiving portion, the third pin-receiving portion and the fourth pin-receiving portion being formed alternately at a circumferential distance from one another.

11. The floating type brake disc according to claim 4,
wherein the U-shaped pin-receiving portion is made up of:
a first pin-receiving portion formed in a manner to enclose the connecting pin from three directions of the radially inner direction, the circumferentially one side, and the radially outer direction of the brake disc, and which has the opening on the circumferentially the other side; and a second pin-receiving portion formed in a manner to enclose the connecting pin from three directions of the radially inner direction, the circumferentially the other side, and the radially outer direction of the brake disc, and which has the opening on the circumferentially one side, the first pin-receiving portion and the second pin-receiving portion being formed alternately at a circumferential distance from each other, and
wherein the tongue-shaped pin-receiving portion is made up of: a third pin-receiving portion to pinch the connecting pin against the first pin-receiving portion; and a fourth pin-receiving portion to pinch the connecting pin against the second pin-receiving portion, the third pin-receiving portion and the fourth pin-receiving portion being formed alternately at a circumferential distance from one another.

12. The floating type brake disc according to claim 7,
wherein each of the connecting pins comprises a cylindrical body portion and a flange portion which is formed at one longitudinal end of the body portion,
wherein, out of an inner diameter of the body portion, the side of longitudinally opposite end is formed locally smaller than the inner diameter on the side of the flange portion, and
wherein the opposite end is formed into a caulking portion of a larger thickness.

* * * * *